US008609049B2

(12) United States Patent
Jackson et al.

(10) Patent No.: US 8,609,049 B2
(45) Date of Patent: Dec. 17, 2013

(54) VAPOUR SUPPRESSION ADDITIVE

(75) Inventors: Phil Jackson, Mayfield West (AU); Moetaz Ibrahim Attalla, Mayfield West (AU); Benjamin Jack Ballinger, Kallangur (AU)

(73) Assignee: Commonwealth Scientific and Industrial Research Organisation, Campbell (AU)

( * ) Notice: Subject to any disclaimer, the term of this patent is extended or adjusted under 35 U.S.C. 154(b) by 0 days.

(21) Appl. No.: 13/579,028

(22) PCT Filed: Feb. 21, 2011

(86) PCT No.: PCT/AU2011/000182
§ 371 (c)(1),
(2), (4) Date: Nov. 2, 2012

(87) PCT Pub. No.: WO2011/100806
PCT Pub. Date: Aug. 25, 2011

(65) Prior Publication Data
US 2013/0052110 A1    Feb. 28, 2013

(30) Foreign Application Priority Data
Feb. 19, 2010 (AU) .................................. 2010900665

(51) Int. Cl.
*B01D 53/62* (2006.01)
*C09K 3/00* (2006.01)

(52) U.S. Cl.
USPC ............. 423/220; 423/228; 423/234; 95/236; 252/184; 252/189; 252/192; 252/193

(58) Field of Classification Search
USPC ............. 423/220, 228, 234; 95/236; 252/184, 252/189, 192, 193
See application file for complete search history.

(56) References Cited

U.S. PATENT DOCUMENTS

| 2,889,197 | A | * | 6/1959 | Baumann | 423/234 |
| 7,641,717 | B2 | * | 1/2010 | Gal | 95/187 |
| 7,846,407 | B2 | * | 12/2010 | Hu | 423/220 |
| 8,328,911 | B2 | * | 12/2012 | Liu et al. | 95/183 |
| 2010/0083828 | A1 | | 4/2010 | Duncan et al. | |
| 2010/0196244 | A1 | | 8/2010 | Grauer et al. | |

FOREIGN PATENT DOCUMENTS

KR    100851493 B1    8/2008

OTHER PUBLICATIONS

International Search Report mailed Apr. 12, 2011 in connection with PCT International Application No. PCT/AU2011/000182, filed Feb. 21, 2011.
Written Opinion of the International Searching Authority mailed Apr. 12, 2011 in connection with PCT International Application No. PCT/AU2011/000182, filed Feb. 21, 2011.
Notification Concerning Transmittal of international Preliminary Report on Patentability (Chapter I of the Patent Cooperation Treaty), including International Preliminary Report on Patentability and Written Opinion of the International Searching Authority, mailed Aug. 30, 2012 in connection with PCT International Application No. PCT/AU2011/000182, filed Feb. 21, 2011.
James et al. (2005). Semi-batch absorption and regeneration studies for $CO_2$ capture by aqueous ammonia. *Fuel Processing Technology*, vol. 86, Issues 14-15, Oct. 2005, pp. 1533-1546.

* cited by examiner

*Primary Examiner* — Timothy Vanoy
(74) *Attorney, Agent, or Firm* — John P. White; Gary J. Gershik; Cooper & Dunham LLP

(57) ABSTRACT

A process for removing $CO_2$ from a $CO_2$ containing gas stream in which the $CO_2$ containing gas stream is contacted with an aqueous ammonium solution. The aqueous ammonia solution comprises 0.1-40% w/v, v/v/w/w ammonia, and a soluble salt at a concentration range of 0.01%-10% wt or v/v or w/v, the soluble salt having cations selected from the group of group IA, IIA, IIIA and IVA metals with counter anions selected from the group of anion of group VIIA elements, $NO_3^-$, $SO_4^{2-}$, $OH^-$, $PO_4^{3-}$ and $HCO_3^-$. The invention also extends to a $CO_2$ capture solvent comprising an aqueous ammonia solution and the above soluble salt.

19 Claims, 3 Drawing Sheets

Figure 2

| Molecule or ammonia complex | $E_0$ (hartree) | $E_0 + ZPE$ (hartree) | $E_0 + ZPE + U + pV$ (hartree) | TS (kJ/mol) | $E_0 + ZPE + H - TS$ (hartree) | $G_{solv}$ (kJ/mol) |
|---|---|---|---|---|---|---|
| $CH_3COOH-NH_3$ | -285.5866874 | -285.4895786 | -285.4767938 | 101.231 | -285.5150274 | -19.46 |
| $NH_3$ | -56.5402569 | -56.5064723 | -56.5025211 | 60.107 | -56.5252227 | -17.78 |
| $CH_3COOH$ | -229.0274190 | -228.9671749 | -228.9590756 | 81.277 | -228.9897730 | -28.33 |
| $NH_4^+$ | -56.8791572 | -56.8304557 | -56.8265687 | 61.592 | -56.8498312 | -334.85 |
| $CH_3COO^-$ | -228.4648845 | -228.4181824 | -228.4106437 | 80.458 | -228.4410317 | -315.06 |
| $MEA-NH_3$ | -266.8659052 | -266.7329515 | -266.7189237 | 108.584 | -266.7599346 | -44.27 |
| MEA | -210.3175941 | -210.2217610 | -210.2123729 | 89.342 | -210.2461161 | -44.18 |
| $HCO_3^-$ | -264.4140915 | -264.3885881 | -264.3825219 | 79.540 | -264.4125632 | -319.53 |
| $HCO_3^- -NH_3$ | -320.9678054 | -320.9056609 | -320.8938261 | 102.303 | -320.9324647 | -291.62 |
| $Tris-NH_3$ | -495.8775705 | -495.6781361 | -495.6552882 | 134.191 | -495.7059705 | -45.48 |
| Tris | -439.3222723 | -439.1605115 | -439.1428625 | 116.397 | -439.1868241 | -55.27 |
| alanine (extended) | -323.6519379 | -323.5464224 | -323.5331314 | 101.756 | -323.5715635 | -48.24 |
| alanine (H-bonded) | -323.6548709 | -323.5485317 | -323.5356728 | 99.347 | -323.5731949 | -50.58 |
| alanine-$NH_3$ (extended) | -380.2117040 | -380.0693199 | -380.0514035 | 122.475 | -380.0976606 | -38.16 |
| alanine-$NH_3$ (H-bonded) | -380.2037167 | -380.0609776 | -380.0431039 | 119.972 | -380.0884159 | -50.67 |
| -alanine (extended) | -323.6527431 | -323.5464686 | -323.5335263 | 101.507 | -323.5716640 | -47.28 |
| -alanine (anti-isomer 1) | -323.6551062 | -323.5478952 | -323.5355608 | 97.987 | -323.5725694 | -55.40 |
| -alanine (anti-isomer 2) | -323.6551060 | -323.5478609 | -323.5355813 | 92.228 | -323.5723030 | -55.44 |
| -alanine-$NH_3$ (H-bonded) | -380.2022958 | -380.0581839 | -380.0409596 | 117.335 | -380.0852754 | -50.75 |
| -alanine-$NH_3$ (extended) | -380.2120746 | -380.0690149 | -380.0514043 | 123.332 | -380.0799854 | -38.03 |

Figure 3

| Molecule or ammonia complex | $E_0$ (hartree) | $E_0$ + ZPE (hartree) | $E_0$ + ZPE + U + pV (hartree) | TS (kJ/mol) | $E_0$ + ZPE + H - TS (hartree) | $G_{solv}$ (kJ/mol) |
|---|---|---|---|---|---|---|
| sarcosine (extended) | -323.6414566 | -323.5358372 | -323.5230418 | 101.434 | -323.5613520 | -47.66 |
| sarcosine (H-bonded) | -323.6418417 | -323.5356731 | -323.5231861 | 101.356 | -323.5614670 | -54.10 |
| sarcosine (anti-isomer) | -323.6425411 | -323.5362862 | -323.5238152 | 100.012 | -323.5615884 | -52.89 |
| sarcosine-NH$_3$ (extended) | -380.1995918 | -380.0575431 | -380.0401126 | 125.098 | -380.0873605 | -38.03 |
| exo-(c-sarcosine)(NH$_3$) | -380.1925301 | -380.0500499 | -380.0323641 | 129.463 | -380.0812606 | -46.82 |
| endo-(c-sarcosine)(NH$_3$) | -380.1917889 | -380.0493058 | -380.0318720 | 121.975 | -380.0779404 | -52.72 |
| Taurine (extended) | -758.8335496 | -758.7281096 | -758.7122264 | 115.703 | -758.7559259 | -72.97 |
| Taurine (H-bonded) | -758.8438411 | -758.7363811 | -758.7216638 | 105.012 | -758.7613256 | -69.37 |
| Taurine (zwitterion) | -758.7899991 | -758.6814663 | -758.6665963 | 110.999 | -758.7085191 | -238.45 |
| Taurine-NH$_3$ (extended) | -815.3986211 | -815.2557261 | -815.2358059 | 132.063 | -815.2856846 | -61.88 |
| exo-(c-taurine)(NH$_3$) | -815.3984052 | -815.2544247 | -815.2349003 | 123.765 | -815.2816446 | -51.17 |
| endo-(c-taurine)(NH$_3$) | -815.3995781 | -815.2563242 | -815.2368291 | 124.597 | -815.2838879 | -60.46 |
| Taurine-NH$_3$ (zwitterion) | -815.3982967 | -815.2534032 | -815.2345023 | 120.171 | -815.2798893 | -115.48 |
| NH$_3$ | | | -56.5032120 | | -56.5260550 | -17.78 |
| Na$^+$ | | | -161.9138720 | | -161.9306610 | -363.67 |
| Na$^+$-NH$_3$ | | | -218.4611870 | | -218.4900250 | -304.13 |

VAPOUR SUPPRESSION ADDITIVE

CROSS-REFERENCE TO RELATED APPLICATIONS

This application is a §371 national stage of PCT International Application No. PCT/AU2011/000182, filed Feb. 21, 2011, claiming priority of Australian Patent Application No. 2010900665, filed Feb. 19, 2010, the contents of each of which are hereby incorporated by reference in their entirety.

FIELD OF THE INVENTION

This invention relates to amines and their use in capturing carbon dioxide from gas streams.

BACKGROUND OF THE INVENTION

There is growing pressure for stationary producers of greenhouse gases to dramatically reduce their atmospheric emissions. Of particular concern is the emission of carbon dioxide ($CO_2$) into the atmosphere. One method of reducing atmospheric $CO_2$ emissions is through its capture at a point source and subsequent storage in geological or other reservoirs.

The process for capturing $CO_2$ from power station and other combustion device flue gases is termed post combustion capture (PCC). The most mature commercially available technology for PCC is solvent-based chemical absorption/release of $CO_2$. When the widespread rollout of PCC technology is realised, enormous quantities of solvent such as ammonia and amine will be required. To put this in perspective, a typical 2.4 GW generator burning pulverised black coal produces approx. 30-50 tonnes $CO_2$/min, or 680 kmol/min. Clearly, the quantity of solvent that will be used cyclically in a PCC plant of this magnitude is unprecedented. The potential environmental impacts of solvents and solvent degradation products (produced via oxidative and thermal processes) needs consideration, especially as release to the local environment through solvent slippage at this scale may be inevitable.

The most attractive physical solvents for $CO_2$ capture are those having such properties as high thermal stability, extremely low vapour pressures, non-flammability, and non-toxicity. Such materials have the potential to capture $CO_2$ with minimal solvent loss in the gas stream.

The use of solutions of ammonia for removing $CO_2$ from flue gas streams is attractive from a chemistry perspective, with a number of important advantages relative to systems that employ monoethanolamine (MEA) or other amines as the solvent, long-known for recovering $CO_2$ from gas mixtures. These advantages include 1. $SO_x$ and $NO_x$ can be absorbed with the possibility of advantageously selling the spent solvent solution as a fertiliser ($SO_x$ and $NO_x$ degrade amine solvents).
2. Ammonia is a low cost chemical, in widespread commercial use.
3. The overall energy required for such a process is projected to be around 40% of that required for MEA systems.

For the ammonia process, the solvent solution consists of ammonium, bicarbonate ions and to a lesser extent, carbonate, in equilibrium with dissolved ammonia (aqueous), and dissolved $CO_2$ (aqueous). In the absorber, water and ammonia react with $CO_2$ (aqueous) to form bicarbonate ions or ammonium carbamate ions, with the reaction reversed in the stripper by the application of energy. The relevant aqueous phase reactions can be summarized by the following overall equations:

$$CO_2 + H_2O + NH_3 \leftrightarrow HCO_3^- + NH_4^+ \quad \text{(eqn. 1)}$$

$$CO_2 + 2NH_3 \leftrightarrow NH_2COO^- + NH_4^+ \quad \text{(eqn. 2)}$$

$$HCO_3^- + NH_3 \leftrightarrow CO_3^{2-} + NH_4^+ \quad \text{(eqn. 3)}$$

$$CO_3^{2-} + H_2O + CO_2 \leftrightarrow 2HCO_3^- \quad \text{(eqn. 4)}$$

Ammonia is a light molecule (molecular weight=17 dalton) which is a gas at temperatures above −30 degrees Celsius (at atmospheric pressure), and it is readily dissolved in water. Sparging aqueous ammonia solutions with a gas stream (such as in a post-combustion capture process) will result in ammonia leaving the solution and entering the gas phase. The amount of free ammonia in the gas phase exiting the absorber is proportional to the amount of aqueous ammonia, which is controlled by solution chemistry and thermodynamic factors such as the temperature: higher temperatures increase the amount of ammonia in the gas phase.

The major concern with the ammonia process has been ammonia loss (or "slip") associated with both the absorber and the stripper. One possible approach to mitigating ammonia slip from capture plants is the use of additives to elevate the aqueous ammonia boiling temperature, thus decreasing ammonia loss via a salt- or azeotropic effect.

It is an object of the present invention to overcome or at least alleviate one or more of the problems associated with the use of ammonia as a $CO_2$ capture solvent.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

Accordingly, in one aspect, the present invention provides a process for removing $CO_2$ from a $CO_2$ containing gas stream comprising the steps of contacting the $CO_2$ containing gas stream with a $CO_2$ capture solvent, the $CO_2$ capture solvent comprising or consisting of an aqueous ammonium solution; the aqueous ammonia solution comprising 0.1% wt to 40% wt ammonia and a soluble salt at a concentration range of 0.01%-10% wt, the soluble salt having one or more cations selected from the group consisting of cations of group IA, IIA, IIIA and IVA metals with counter anions selected selected from the group consisting of anions of group VIIA elements, and $NO_3^-$, $SO_4^{2-}$, $OH^-$, $PO_4^{3-}$ and $HCO_3^-$ and other water-soluble counter-anions, and absorbing $CO_2$ from the $CO_2$ containing gas stream into the $CO_2$ capture solvent.

In another aspect of the invention, there is provided a $CO_2$ capture solvent comprising or consisting of an aqueous ammonia solution having an ammonia concentration of 0.1% wt through to 40%; and a soluble salt at a concentration range of 0.01%-10% wt, the soluble salt having one or more cations selected from the group consisting of group IA, IIA, IIIA and IVA metals with one or more counter anions selected from the group consisting of anions of group VIIA elements, and $NO_3^-$, $SO_4^{2-}$, $OH^-$, $PO_4^{3-}$ and $HCO_3^-$ or other water-soluble counter-anion.

In a preferred form of the above aspects of the invention, the cations of the soluble salt are cations of one or more elements selected from the group consisting of Li, Na, K, Rb, Cs, Fr, Be, Mg, Ca, Sr, Ba, Ra, and the anions are one or more anions selected from the group consisting of anions of elements F, Cl, Br, I, At, and $NO_3^-$, $SO_4^{2-}$, $OH^-$, $PO_4^{3-}$ and $HCO_3^-$ or other water-soluble counter-anion.

The additive may be a solution of salts, a pure solid, a heterogeneous solid mixture of several salts or a mixture of aqueous salts (salts dissolved in water). The additive may be crystalline, powdered, molten or any other state when added. The salt may also be added as a hydrous crystalline solid i.e. the salt is a solid containing water of crystallisation. The salts may also be added as mixed solid salts eg. $Na_{(x)}K_{(1-x)}Cl$. The salts may be dissolved in a solvent miscible with water for addition to bulk quantities of aqueous ammonia solution. In preferred forms of the invention, the water soluble salts are added to a concentration of 0.1-5% wt and most preferably 1-3% wt.

The concentration of the aqueous ammonia solution used for $CO_2$ capture ranges in concentration from 0.1% wt through to 40% wt. The sole purpose of the additive is to reduce the amount of dissolved ammonia which is transferred to the gas phase upon absorption of $CO_2$ contained in power station flue gas. The ammonia may be the sole $CO_2$ capture solvent or it may be blended with other solvents. These other solvents may include any $CO_2$ capture amine in any concentration less than the concentration of ammonia in the blended solvent. The chemical structures of some common suitable capture solvents are presented below:

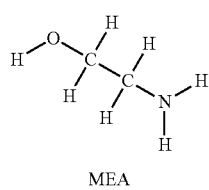

MEA

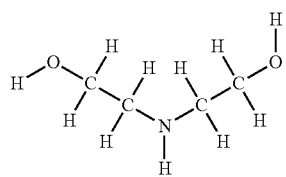

DEA

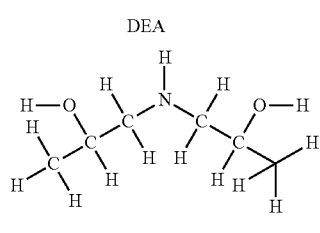

DIPA

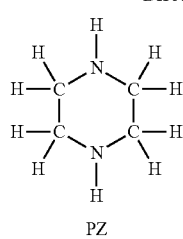

PZ

-continued

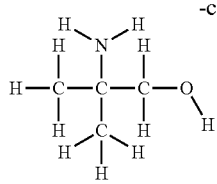

AMP

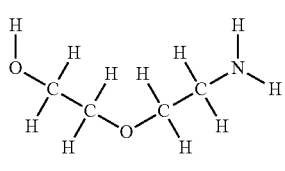

DGA

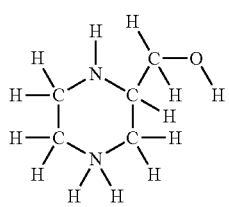

2-PM

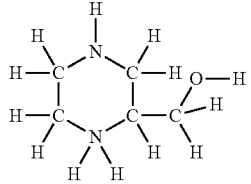

3-PM

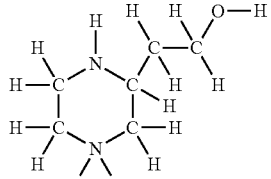

2-PE

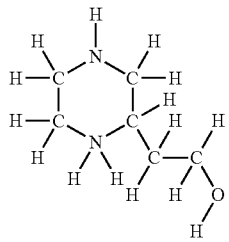

3-PE

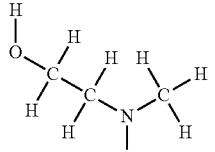

N-methyl-MEA

-continued

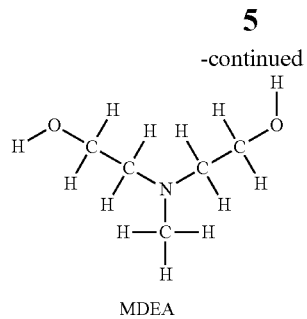

MDEA

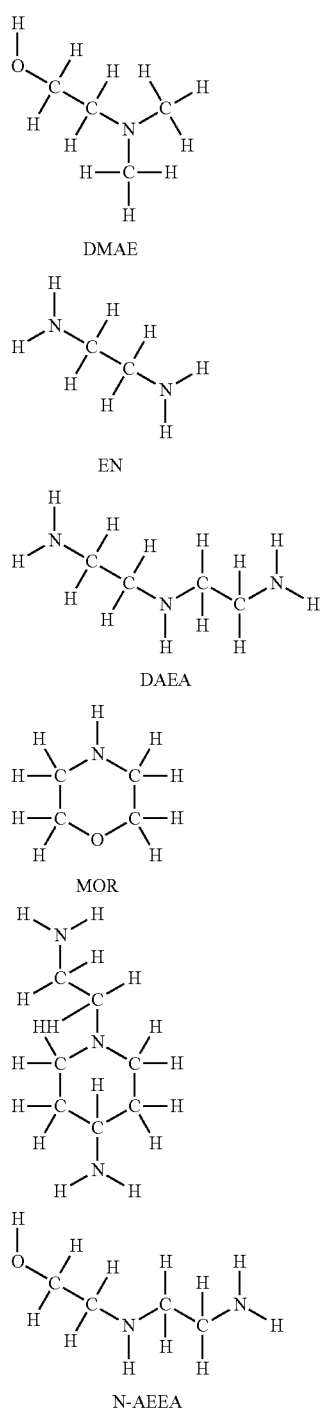

DMAE

EN

DAEA

MOR

N-AEEA

-continued

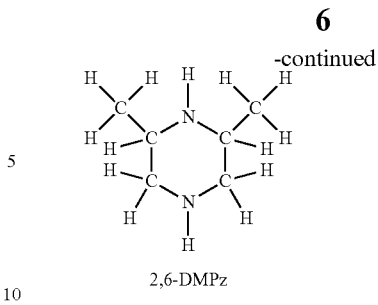

2,6-DMPz

In particular, the additional solvent is selected from the group consisting of MEA (monoethanolamine), DEA (diethanolamine), AMP (2-Amino-2-methylpropanol), MDEA (methyldiethanolamine) and PZ (Piperazine), methyldiethanolamine (MDEA), diglycolamine (DGA), and di-isopropanolamine (DIPA) and blends of two or more thereof. The concentration of these additional solvent in the blended solvent is less than the concentration of ammonia in the blended solvent. Hence in circumstances where a blended solvent may be used the concentration of ammonia in the solvent is in the range of 20-40% wt.

In the preferred forms of the invention salt, the cation is one or more selected from cations selected from the group consisting of barium, caesium or rubidium and the anion is chloride, $PO_4^{3-}$ or nitrate.

As used herein, except where the context requires otherwise, the term "comprise" and variations of the term, such as "comprising", "comprises" and "comprised", are not intended to exclude further additives, components, integers or steps.

BRIEF DESCRIPTION OF THE DRAWINGS/FIGURES

FIG. 2 is a table of thermochemical values computationally determined for additives added to ammonia.

FIG. 3 is a table of thermochemical values computationally determined for additives added to ammonia.

DETAILED DESCRIPTION OF THE EMBODIMENTS

Figure 1:
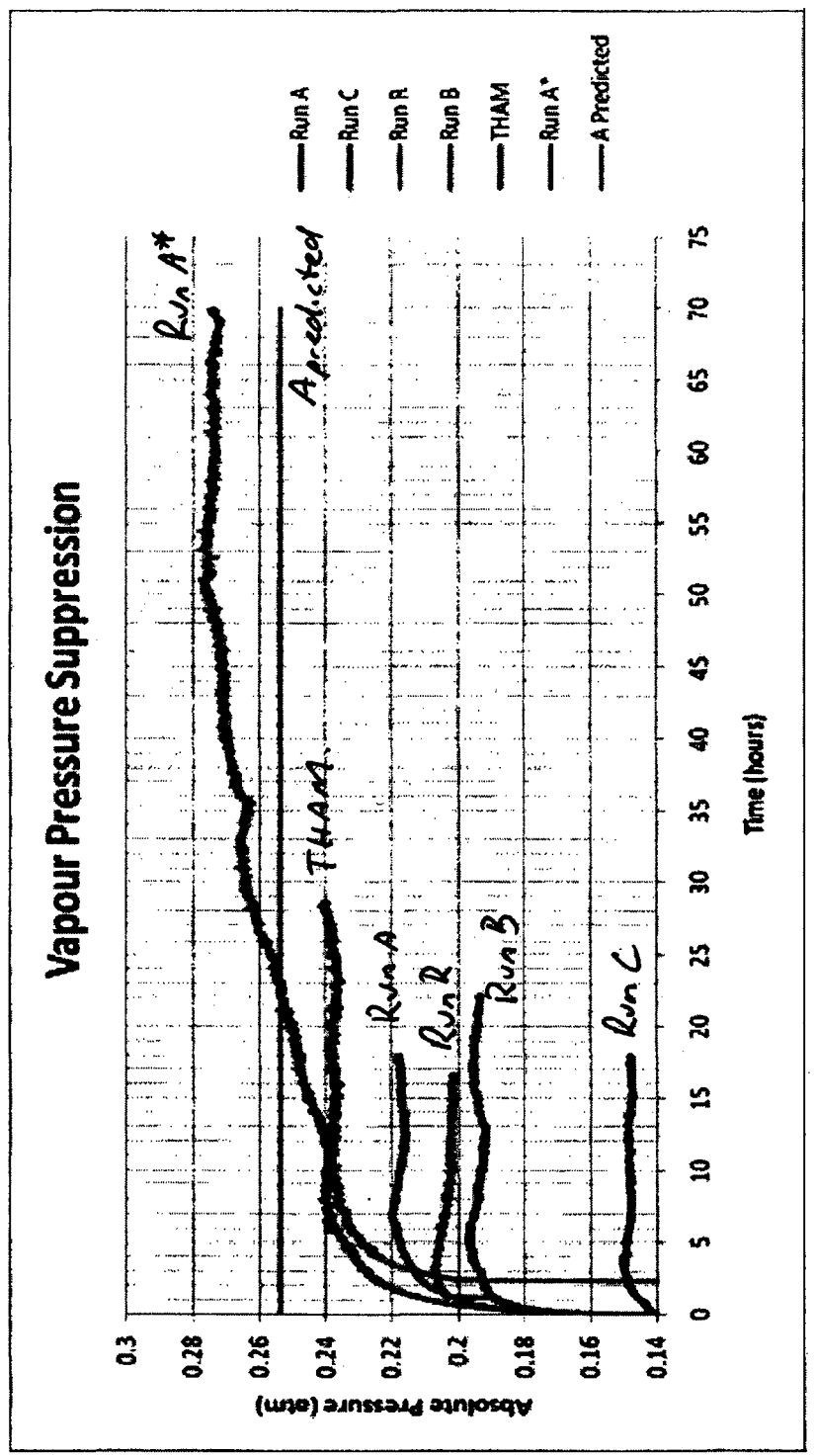
FIG. 1 is a graph of the equilibrium headspace pressures above 150 ml solution containing 10% wt aqueous ammonia and various additives.

The inventors objective is to discover an additive, which, when added to ammonia, will elevate the solution boiling temperature and thus decrease $NH_3$ loss via a binary azeotropic effect. In this work, calculations have been undertaken on the model systems $CH_3COOH$—$NH_3$ (a heat-stable salt), MEA-$NH_3$, tris(THAM)-$NH_3$, $Na^+$—$NH_3$ and $HCO_3^-$—$NH_3$.

Computational Method

B3LYP/6-31++G(d,p) works well for relative hydrogen bond strengths, and the thermochemical values produced are usually within 10 kJ/mol of experimental results, so it has been used in this instance. The zero point energies were scaled using the Scott/Radom factor of 0.9806, and the vibrational entropy contribution to the partition function was scaled by 1.0015. All results are for a temperature of 298.15 K. With the exception of the $Na^+$—$NH_3$ calculations, performed at the G3 level with the Gaussian 03 programme, the GAMESS software running on an SGI-Altix multi-node DDI system located at Docklands, VIC, was used for the calculations. The computational results are presented in Tables 1(a) and 1(b)

The numbers in Tables 1(a) and 1(b) can be used to calculate the energy of the reaction:

X—NH$_3$ → X+NH$_3$

These numbers are presented in Tables 2.

TABLE 2

Electrostatic-hydrogen bond/NH$_3$ reaction energies at 298.15K.

| X—NH$_3$ → X + NH$_3$ X= | $\Delta H_{(g)}$ kJ/mol | $\Delta G_{(g)}$ kJ/mol | $\Delta G_{(soln)}$ kJ/mol |
|---|---|---|---|
| Na$^+$ | 116.8 | 88.2 | 10.9 |
| CH$_3$COOH | 40.2 | 0.1 | −26.6 |
| * (RHS = CH$_3$COO$^-$ + NH$_4^+$) | 634.3 | 593.5 | −36.9 |
| MEA | 37.3 | −30.2 | −47.9 |
| HCO$_3^-$ | 23.2 | −14.1 | −59.8 |
| tris | 26.2 | −16.1 | −43.7 |

In turn, these values can be used to calculate equilibrium constants using $G = -RT \cdot \ln(K_{eq})$.

These values are contained in Table 3.

TABLE 3

Equilibrium constants for the hydrogen bonded complexes computed to date.

| X—NH$_3$ → X + NH$_3$ X= | $K_{eq}$, 298.15K |
|---|---|
| Na$^+$ | 0.012 |
| CH$_3$COOH | 45718 |
| * (RHS = CH$_3$COO$^-$ + NH$_4^+$) | 2.91e$^6$ |
| MEA | 2.46e$^8$ |
| HCO$_3^-$ | 2.99e$^{10}$ |
| tris | 4.52e$^7$ |

As seen above, the electrostatic bond with sodium, not unexpectedly, is a strong gas-phase bond, and equilibrium lies well towards the association complex, even in the solution phase. Gas-phase charge separation for CH$_3$COOH—NH$_3$ to form CH$_3$COO$^-$ and NH$_4^+$ requires substantial energy (see Tables 2(a) and 2(b)), hence the large enthalpy value for the separation of CH$_3$COOH—NH$_3$ into these products. The gas phase dipole-dipole interaction for CH$_3$COOH—NH$_3$ has a strength of about 40 kJ/mol.

Of the alkanolamines investigated, MEA forms as strong an interaction with ammonia as trishydroxymethylaminomethane, although the equilibrium constant (298 K) suggests tris might slightly favour complexation of ammonia Clearly, sodium cation favours complexation most strongly, while HCO$_3^-$ favours the dissociated product (the hydroxyl group hydrogen is not acidic at all)

It is presumed throughout that if complex-formation is preferred, and, if this is reflected in the equilibrium constant, it follows that a higher solvent boiling temperature will be observed together with a reduction in volatility.

Based on this information, MEA should work just as well as tris in reducing the volatility of ammonia.

Based on this information, water soluble salts at a concentration range of 0.01%-10% wt will be suitable to suppress the volatility of ammonia in solution. Soluble salts which favour vapour pressure suppression include those having one or more cations selected from the group consisting of group IA, IIA, IIIA and IVA metals with one or more counter anions selected from the group consisting of anions of group VIIA elements, and NO$_3^-$, SO$_4^{2-}$, OH$^-$, PO$_4^{3-}$ and HCO$_3^-$ or other water-soluble counter-anion. These specifically include one or more soluble salts having cations of elements selected from the group consisting of Li, Na, K, Rb, Cs, Fr, Be, Mg, Ca, Sr, Ba, Ra, and anions selected from the group consisting of anions of elements F, Cl, Br, I, At, and NO$_3^-$, SO$_4^{2-}$, OH$^-$, PO$_4^{3-}$ and HCO$_3^-$ or other water-soluble counter-anion.

In order to evaluate the effectiveness of soluble salts in suppressing the volatility of the ammonia, the following experiments were performed.

Experimental Procedure for VLE Measurements.

For aqueous NH$_3$ solutions and vapour suppressors, addition of a suppressor should result in a lower equilibrium headspace pressure if suppression is taking place (compared with the equivalent solution with no suppressor added).

Vapour suppression % = $(P_{no\ suppress} - P_{suppress}) / P_{no\ suppress} \times 100$ Experiments were conducted to evaluate the vapour suppression of a number of soluble salts and the results are shown in FIG. 1 in which Run B=BaCl$_2$; Run C=CsCl; Run R=RbCl; Run A=ammonia and Run THAM=tris(hydroxymethyl)aminomethane, (HOCH$_2$)$_3$CNH$_2$.

A vapour-liquid equilibrium apparatus is used in these experiments, consisting of a Parr pressure reactor, some pressure sensors, gas lines, thermocouples, control software and a waterbath.

The reactor was filled with 150 ml of a solution consisting of 10% wt ammonia and 1% wt soluble salt added as ionic solids. The solution temperature was allowed to equilibrate while the system was repeatedly evacuated and flushed with nitrogen to purge air from the test sample. Finally, the headspace was evacuated, and pressure above the liquid (in the headspace) was logged until equilibrium is reached ($\Delta p$, $\Delta T=0$ the pressure/temperature remain constant for at least 1 hour).

The values were recorded. Next, a solution of water was assessed under the same conditions (to correct for baseline when aqueous solutions are analysed)

FIG. 1 is a graph of the equilibrium headspace pressures above 150 ml solution containing 10% wt aqueous ammonia and various additives. In reviewing the results in FIG. 1, the lower the value, the more favourable the suppression of NH$_3$. Any absolute pressure values are meaningless, as they were measured with a transmitter which has a range 0-20 bar. The relative values are important. The y-axis values are equal to the difference between the sensor pressure reading and the actual lab pressure (measured using a barometer). Partial pressure of water vapour is 2.3-3.2 kPa (0.02-0.03 atm). The experiments were conducted at room temperature, and the graph running out to 70 hours (asterisk in the Figure legend) reveals the effects of laboratory temperature fluctuations on the measured values.

Mean pressure value for CsCl=0.153 atm

Corrected for partial pressure of water=0.123-0.133 atm (av=0.128 atm)

Mean pressure value for ammonia=0.218 atm

Corrected for partial pressure of water=0.188-0.198 atm (av=0.193 atm)

Average vapour suppression by CsCl 34% (range=29-38%)

The straight horizontal line at absolute pressure approximately 0.254 atm is the mean of 3 repeat aqueous ammonia runs. Run C, Run B and Run R. The results demonstrate a clear vapour suppression effect due to additives C=caesium chloride, B=barium chloride, R=rubidium chloride. The equilibrium pressure attained after 5 hours is lower than the mean equilibrium pressure attained for 10% wt aqueous ammonia without additives.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A $CO_2$ capture solvent comprising
an aqueous ammonia solution having an ammonia concentration of 0.1% w/w to 40% w/v; and
a water soluble salt at a concentration range of 0.01%-10% wt based on the $CO_2$ capture solvent, the water soluble salt having one or more cations selected from the group consisting of group IA and IIA metals with one or more counter anions selected from the group consisting of anions of group VIIA elements, $NO_3^-$, $SO_4^{2-}$, $OH^-$, $PO_4^{3-}$ and $HCO_3^-$.

2. The capture solvent of claim 1, wherein the cations of the soluble salt are one or more elements selected from the group consisting of cations of Li, Na, K, Rb, Cs, Fr, Be, Mg, Ca, Sr, Ba, Ra, and the anions are one or more anions selected from the group consisting of anions of elements F, Cl, Br, I, At, and $NO_3^-$, $SO_4^{2-}$, $OH^-$, $PO_4^{3-}$ and $HCO_3^-$.

3. The capture solvent of claim 2, wherein the cation is a cation of barium, caesium or rubidium.

4. The capture solvent of claim 2, wherein the anion is a chloride, nitrate or $PO_4^{3-}$.

5. The capture solvent of claim 1, wherein the water soluble salts are added to a concentration of 0.1-5% wt.

6. The capture solvent of claim 5, wherein the water soluble salts are added to a concentration of 1-3% wt.

7. The capture solvent of claim 1 further comprising one or more additional solvents selected from the group of MEA (monoethanolamine), DEA, diethanolamine, AMP (2-Amino-2-methylpropanol), MDEA (methyldiethanolamine) and PZ (piperazine), methyldiethanolamine (MDEA), diglycolamine (DCA), and di-isopropanolamine (DIPA) and blends thereof to form a blended solvent wherein the concentration of the additional solvent or solvents is less that the concentration of ammonia in the blended solvent.

8. A process for removing $CO_2$ from a $CO_2$— containing gas stream comprising the steps of
contacting the $CO_2$-containing gas stream with a $CO_2$ capture solvent solution; the $CO_2$ capture solvent comprising an aqueous ammonia solution comprising 0.1% w/v, v/v/w/w to 40% w/v ammonia, and a water soluble salt at a concentration range of 0.01%-10% wt or v/v or w/w based on the $CO_2$ capture solvent, the water soluble salt having one or more cations selected from the group consisting of group IA and IIA metals with one or more counter anions selected from the group consisting of anions of group VIIA elements, and $NO_3^-$, $SO_4^{2-}$, $OH^-$, $PO_4^{3-}$ and $HCO_3^-$; and
absorbing $CO_2$ from the $CO_2$ containing gas stream into the ammonia solution.

9. The process of claim 8, wherein the cations of the water soluble salt are cations of one or more elements selected from the group consisting of Li, Na, K, Rb, Cs, Fr, Be, Mg, Ca, Sr, Ba, Ra, and the anions are one or more anions selected from the group consisting of anions of elements F, Cl, Br, I, At, and $NO_3^-$, $SO_4^{2-}$, $OH^-$, $PO_4^{3-}$ and $HCO_3^-$.

10. The process of claim 8, wherein the cations comprise a cation selected from the group consisting of cations of barium, caesium and rubidium.

11. The process of claim 9, wherein the anion is a chloride, nitrate or $PO_4^{3-}$.

12. The process of claim 8, wherein the water soluble salts are added to a concentration of 0.1-5% wt.

13. The process of claim 12, wherein the water soluble salts are added to a concentration of 1-3% wt.

14. The process of claim 8 further comprising one or more additional solvents selected from the group consisting of MEA (monoethanolamine), DEA, diethanolamine, AMP (2-Amino-2-methylpropanol), MDEA (methyldiethanolamine) and PZ (piperazine), methyldiethanolamine (MDEA), diglycolamine (DGA), and di-isopropanolamine (DIPA) and blends thereof to form a blended solvent wherein the concentration of the additional solvent or solvents in the blended solvent is less that the concentration of ammonia in the blended solvent.

15. The capture solvent of claim 3, wherein the water soluble salts are added to a concentration of 0.1-5% wt.

16. The capture solvent of claim 15, wherein the water soluble salts are added to a concentration of 1-3% wt.

17. The capture solvent of claim 3 consisting of further comprising one or more additional solvents selected from the group of MEA (monoethanolamine), DEA, diethanolamine, AMP (2-Amino-2-methylpropanol), MDEA (methyldiethanolamine) and PZ (piperazine), methyldiethanolamine (MDEA), diglycolamine (DGA), and di-isopropanolamine (DIPA) and blends thereof to form a blended solvent wherein the concentration of the additional solvent or solvents is less that the concentration of ammonia in the blended solvent.

18. The process of claim 10, wherein the water soluble salts are added to a concentration of 0.1-5% wt.

19. The process of claim 10 further comprising one or more additional solvents selected from the group consisting of MEA (monoethanolamine), DEA, diethanolamine, AMP (2-Amino-2-methylpropanol), MDEA (methyldiethanolamine) and PZ (piperazine), methyldiethanolamine (MDEA), diglycolamine (DGA), and di-isopropanolamine (DIPA) and blends thereof to form a blended solvent wherein the concentration of the additional solvent or solvents in the blended solvent is less that the concentration of ammonia in the blended solvent.

* * * * *